United States Patent
Gruler et al.

(10) Patent No.: US 11,839,960 B2
(45) Date of Patent: Dec. 12, 2023

(54) WORKPIECE PALLET AND MACHINING SYSTEM

(71) Applicant: Maschinenfabrik Berthold Hermle AG, Gosheim (DE)

(72) Inventors: Stefan Gruler, Rottweil (DE); Wilfried Mattes, Mühlheim (DE); Franz-Xaver Bernhard, Spaichingen (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 723 days.

(21) Appl. No.: 16/937,238

(22) Filed: Jul. 23, 2020

(65) Prior Publication Data

US 2021/0023680 A1  Jan. 28, 2021

(30) Foreign Application Priority Data

Jul. 25, 2019  (EP) .................................... 19188265

(51) Int. Cl.
*B25B 5/10* (2006.01)
*B23Q 1/25* (2006.01)
*B23Q 39/00* (2006.01)

(52) U.S. Cl.
CPC ............ *B25B 5/106* (2013.01); *B23Q 1/25* (2013.01); *B23Q 39/00* (2013.01); *Y10T 409/30616* (2015.01)

(58) Field of Classification Search
CPC ........... B25B 11/00; B23Q 3/08; B23Q 3/086; B23Q 3/102; B23Q 3/103; B23Q 3/107; B23Q 3/108
See application file for complete search history.

(56) References Cited

U.S. PATENT DOCUMENTS

| 3,942,778 A | * | 3/1976 | Fadiga | .................. | B25B 1/2421 |
| | | | | | 269/26 |
| 2015/0246421 A1 | * | 9/2015 | Canuto | ................ | B23Q 1/0081 |
| | | | | | 279/144 |

FOREIGN PATENT DOCUMENTS

| DE | 102007017759 | 10/2008 |
| DE | 102007017759 A1 | 10/2008 |
| DE | 102013224649 | 6/2015 |
| DE | 102013224649 A1 | 6/2015 |
| DE | 102017114812 A1 | 1/2018 |
| EP | 0087719 | 9/1983 |
| EP | 0087719 A2 | 9/1983 |

(Continued)

*Primary Examiner* — Tyrone V Hall, Jr.
(74) *Attorney, Agent, or Firm* — Hoffmann & Baron, LLP (57) ABSTRACT

A workpiece pallet for use for additive and subtractive workpiece machining, including a clamping plate which has a first interface which is designed for a form-fitting fixation to a machining table of a processing machine, the workpiece pallet further including a receiving plate, which has a second interface for fixing a workpiece, wherein the clamping plate and the receiving plate are arranged spaced apart from one another and wherein a supporting web is arranged in a connecting gap between an upper surface of the clamping plate and a lower surface of the receiving plate, which supporting web is connected to the upper surface of the clamping plate and to the lower surface of the receiving plate, the supporting web having in a cross-sectional plane aligned parallel to the lower surface of the receiving plate a cross-sectional area which is less than 15 percent of an area of the lower surface of the receiving plate.

15 Claims, 2 Drawing Sheets

(56) References Cited

FOREIGN PATENT DOCUMENTS

| | | |
|---|---|---|
| EP | 0614725 | 9/1994 |
| EP | 0614725 A2 | 9/1994 |
| FR | 2700487 | 7/1994 |
| JP | S58-149101 A | 10/1983 |
| JP | 2018-1390 A | 3/1992 |
| JP | H07009291 A | 1/1995 |
| JP | H07132429 A | 5/1995 |
| JP | 2017-505237 A | 2/2017 |

\* cited by examiner

WORKPIECE PALLET AND MACHINING SYSTEM

BACKGROUND OF THE INVENTION

The invention relates to a workpiece pallet for use in additive and subtractive workpiece machining. Furthermore, the invention relates to a machining system in which the workpiece pallet according to the invention is used.

DE 10 2013 224 649 A1 discloses a machine tool comprising a machine control, a machine frame, a workpiece table, a tool holder, several translational and/or rotational axes for adjusting a relative position between the workpiece table and the tool holder, a tool magazine for one or more material-removing, in particular cutting tools, a tool changing mechanism for automatically moving tools between the tool holder and the tool magazine. Furthermore the machine tool comprises a build-up welding head which can be inserted into the tool holder and which has a workpiece temperature control device, which workpiece temperature control device is inserted between a workpiece table and a workpiece during the production of the workpiece, in particular during build-up welding, and which comprises a heater, wherein an insulating layer for thermal insulation of the heater from the workpiece table and optionally also a cooling device can be provided, wherein the heater is designed to heat the workpiece to temperatures of over 250 degrees Celsius.

SUMMARY OF THE INVENTION

The purpose of the invention is to provide a workpiece pallet and a machining system which allow an improved work sequence when carrying out combined application operations (additive workpiece machining) and removal operations (subtractive workpiece machining).

The problem of the invention is solved for a workpiece pallet comprising a clamping plate, which comprises a first interface, which is designed for a form-fitting fixation with a machining table of a processing machine, the workpiece pallet furthermore comprising a receiving plate for fixing a workpiece, which receiving plate comprises a second interface for fixing a workpiece, wherein the clamping plate and the receiving plate are arranged at a distance from one another and wherein a supporting web is arranged in a connecting gap between an upper surface of the clamping plate and a lower surface of the receiving plate, which supporting web is connected to the upper surface of the clamping plate and to the lower surface of the receiving plate, the supporting web having, in a cross-sectional plane aligned parallel to the lower surface of the receiving plate, a cross-sectional area which is less than 15 percent, preferably less than 10 percent, particularly preferably less than 5 percent, in particular less than 1 percent, of an area of the lower surface of the receiving plate.

The clamping plate serves for fixing the workpiece pallet to a machining table of a processing machine. Preferably the clamping plate is designed as a plane-parallel plate, wherein the two largest surfaces of the clamping plate are arranged in planes that are aligned parallel to each other. These two largest surfaces do not necessarily need to be completely flat. With such a design of the clamping plate, an lower surface of the clamping plate facing away from the receiving plate rests flat on a typically flat surface of the machining table and can thus ensure an advantageous force transmission between the workpiece pallet and the machining table. Furthermore, the upper surface of the clamping plate faces the receiving plate and is connected with the supporting web. In particular the clamping plate is realized in one piece with the supporting web. A material thickness of the clamping plate which is named a first material thickness is defined by the distance between the two largest surfaces of the clamping plate, i.e. the distance between the lower surface and the upper surface of the clamping plate.

The receiving plate, whose upper surface faces away from the clamping plate and is used to receive a workpiece, is a plane-parallel plate. The workpiece may be bolted directly onto the upper surface of the receiving plate. As an alternative the workpiece may be fixed to the surface of the receiving plate by means of clamping elements such as manually operated clamping claws. Furthermore, the lower surface of the receiving plate faces the clamping plate and is connected to the supporting web. Preferably the receiving plate is connected in one piece with the supporting web. A material thickness of the receiving plate which is named a second material thickness is defined by the distance between the two largest surfaces of the receiving plate, i.e. the distance between the lower surface and the top side of the receiving plate.

In order to achieve a favourable compromise between a resilient mechanical coupling of the clamping plate and the receiving plate and a thermal decoupling of the clamping plate from the receiving plate, the clamping plate and the receiving plate are arranged at a distance from each other and connected to each other with a supporting web. The supporting web is arranged in a connecting gap between the clamping plate and the receiving plate and is mechanically connected to a top side of the clamping plate facing the receiving plate and to a bottom side of the receiving plate facing the clamping plate. Preferably the largest surfaces of the support web are aligned transversely to the upper surface of the clamping plate and transversely to the lower surface of the receiving plate. Furthermore, it is preferably provided that a cross-sectional area of the supporting web in a cross-sectional plane aligned parallel to the lower surface of the receiving plate is less than 15 percent, preferably less than 10 percent, particularly preferably less than 5 percent, especially less than 1 percent, of the area of the lower surface of the receiving plate.

The area of the lower surface of the receiving plate, which is to be compared with the cross-sectional area of the supporting web, is for example the total area of the receiving plate facing the clamping plate. Preferably, the area of the lower surface of the receiving plate is the area that can be determined by projecting the lower surface of the receiving plate onto the cross-sectional plane in which the area of the supporting web is determined. If the lower surface of the receiving plate is uneven, for example if it comprises several surface sections arranged in different planes, it is useful for the determination of the area of the lower surface of the receiving plate to use the projection of the area of the lower surface of the receiving plate into the cross-sectional plane.

The above-described design of the supporting web ensures a low thermal coupling and therefore a good thermal isolation between the clamping plate and the receiving plate. During a heating of the receiving plate and the workpiece mounted on the receiving plate only a small extent of the heat is transferred to the clamping plate due to the small cross section of the support web. This ensures that even when the receiving plate is heated, the workpiece pallet does not experience significant positional tolerances in relation to the machining table that would jeopardize precise machining of the workpiece mounted on the workpiece pallet.

Furthermore a distance between the upper surface of the clamping plate and the lower surface of the receiving plate, which can also be called the gap width of the connecting gap between the clamping plate and the receiving plate, corresponds at least to the first material thickness of the clamping plate and/or the second material thickness of the receiving plate. Preferably the gap width of the connecting gap is 1.5 times to 3 times the first material thickness and/or the second material thickness.

Advantageous further developments of the invention are subject of the subclaims.

It is useful if the clamping plate is made of a first metal material having a first coefficient of thermal expansion and if the receiving plate is made of a second metal material having a second coefficient of thermal expansion, wherein the first coefficient of thermal expansion is greater than the second coefficient of thermal expansion and wherein the second coefficient of thermal expansion is less than $16/10000$ [1/K]. Due to this selection of the first metal material and the second metal material a distortion of the workpiece pallet which could lead to a form deviation for the workpiece pallet and to a position deviation resulting from the form deviation for the workpiece connected with the workpiece pallet is minimized. In practical use of the workpiece pallet the receiving plate is heated to temperatures in an interval between 300 degrees Celsius and 550 degrees Celsius, preferably to a temperature of 400 degrees Celsius for the machining the workpiece fixed to the workpiece pallet. Due to the distance between the clamping plate and the receiving plate, which is achieved by the mechanical connection and the extensive thermal decoupling by means of the supporting web, the clamping plate heats up much less, for example to temperatures in an interval of 50 degrees Celsius to 150 degrees Celsius.

If the same metal material were selected for the clamping plate and the receiving plate, considerable differences in the thermal expansions of the clamping plate and the receiving plate would occur within the workpiece pallet due to the large temperature differences between the clamping plate and the receiving plate.

If, on the other hand, different metal materials are selected for the clamping plate and the receiving plate and the first coefficient of thermal expansion of the clamping plate is greater than the second coefficient of thermal expansion of the receiving plate, only slight internal stresses occur in the clamping plate, the receiving plate and the supporting web, even if there is a temperature difference of approx. 200 degrees Celsius to 400 degrees Celsius between the clamping plate and the receiving plate, if the metal materials are selected appropriately. This can prevent undesirable elastic or even plastic deformation of the workpiece pallet, in particular of the supporting web.

It is preferably provided that the supporting web together with the clamping plate and the receiving plate delimits at least one, in particular closed, cavity and/or that the supporting web is made of a metal material which has a specific thermal conductivity of less than 30 W/mK, in particular of less than 20 W/mK, and/or a coefficient of thermal expansion of less than $16/1000000$ [1/K], in particular of less than $14/1000000$ [1/K].

By way of example, the clamping plate may have a coefficient of thermal expansion in an interval between $16/1000000$ [1/K] and $18/1000000$ [1/K].

Preferably, the supporting web is arranged in the connecting gap between the clamping plate and the receiving plate close to outer edge areas of the clamping plate and the receiving plate. It is preferably provided that the clamping plate and the receiving plate each have at least substantially the same cross-section, for example circular or square or rectangular, in a cross-sectional plane oriented transversely to a distance between the clamping plate and the receiving plate and parallel to the largest surfaces of the clamping plate and the receiving plate. Furthermore, it is preferably provided that the supporting web extends at least partially, in particular completely, along a circumferential outer edge of the clamping plate or the receiving plate. The cavity which is formed by the upper surface of the clamping plate, the lower surface of the receiving plate and the inwardly facing (largest) surface of the supporting web, thus corresponds at least almost completely to the connecting gap. Preferably the cavity is closed to allow a control of the heat transfer between the significantly warmer receiving plate and the cooler clamping plate.

Preferably at least one insulating material from the group: gas, liquid, solid, is accommodated in the cavity and/or that the cavity is evacuated. It is preferable that the cavity is filled with a solid that ensures a thermal insulation effect. Materials such as glass fibre mats or ceramic fibre mats can be used for this purpose. In addition or alternatively, it can be planned to evacuate the cavity in order to minimize the transfer of radiant heat from the receiving plate to the clamping plate by air or other gases contained in the cavity.

Furthermore, the heat transfer between the receiving plate and the clamping plate is limited by a suitable material selection for the support web. It is preferable that the specific thermal conductivity of the material from which the support web is made is less than 30 W/mK, in particular less than 20 W/mK.

In addition or alternatively, it may be provided that the support web is made of a metal material which has a coefficient of thermal expansion of less than $16/1000000$ [1/K], in particular less than $14/1000000$ [1/K]. This ensures low thermal expansion of the supporting web and low heat transfer through the supporting web from the receiving plate to the clamping plate.

In further embodiment of the invention, it is provided that a compensating valve is attached to the clamping plate or to the receiving plate or to the supporting web, which is designed for a predeterminable, fluidically communicating connection between the cavity and an environment of the workpiece pallet for limiting a differential pressure between the cavity and the environment. A compensating valve must be provided to prevent pressure differences between the cavity and a surrounding area of the workpiece pallet, since otherwise an undesirable fluid expansion, in particular gas expansion, can occur when using the workpiece pallet due to the intended heating of the receiving plate. The compensating valve is preferably designed in such a way that it enables a fluid, in particular a gas, to flow out of the cavity in the presence of an overpressure in the cavity, which has a predeterminable pressure difference relative to the environment. Additionally or alternatively the compensating valve is designed to enable ambient air to flow into the cavity in the presence of a negative pressure difference relative to the environment. In a simplified design, the compensating valve is designed as a pressure relief valve, which enables a fluid, in particular a gas, to flow out of the cavity when there is an excess pressure in the cavity which has a predeterminable pressure difference with respect to the environment. For example the compensating valve is a spring-loaded check valve.

It is advantageous if the support web is formed in one piece with the receiving plate and projects from an lower surface of the receiving plate facing the clamping plate in the direction of the clamping plate and is fixed to an upper surface of the clamping plate facing the receiving plate with fasteners. This ensures a reliable mechanical connection between the support web and the receiving plate. When the workpiece pallet is used, the receiving plate is heated to a temperature within an interval of between 300 degrees Celsius and 550 degrees Celsius, preferably to a temperature of 400 degrees Celsius. Due to this heating of the receiving plate a considerable thermal expansion of the receiving plate occurs in the process. The one-piece design of the supporting web with the receiving plate allows a homogeneous flow of forces and a homogeneous temperature distribution between the supporting web and the lower surface of the receiving plate, which would be impossible or very difficult to achieve if the supporting web was bolted with screws to the lower surface of the receiving plate. In addition, the one-piece design of the supporting web with the receiving plate avoids critical problems that could occur when the supporting web is screwed to the lower surface of the receiving plate with regard to unintentional loosening of screw connections and/or overloading of the screw connections. It is preferable that an end area of the supporting web facing away from the receiving plate is fastened to the top of the clamping plate facing the receiving plate with fasteners. For example, it may be provided that this end region of the support web is attached laterally to a circumferential edge surface of the clamping plate, for example with screws. As an alternative design for the workpiece pallet the support web, the receiving plate and the clamping plate ad manufactured in one piece.

Such a workpiece pallet can be manufactured in particular in a generative/additive workpiece machining process such as the cold gas spraying described in German patent application DE 10 2007 017 759 A1. In particular, the different material selection for the clamping plate and the receiving plate can be realized. In addition, it can be provided that the supporting web has a material gradient in its course between the clamping plate made of a first material and the receiving plate made of a second material, i.e. an alloy change between the first material and the second material is realized in order to realize a particularly advantageous adaptation to the coefficients of thermal expansion of the clamping plate and the receiving plate.

Preferably, the supporting web is designed as a circular ring which extends along a distance axis between the clamping plate and the receiving plate and which has a fastening region which is designed as a ring collar extending in the radial direction, in particular outwards, and which is penetrated by the fasteners, in particular screws or threaded bolts, arranged on the upper surface of the clamping plate. In this way, a homogeneous stress distribution can be achieved in the supporting web when using the workpiece pallet. It is preferable that the largest surfaces of the clamping plate and/or the receiving plate are of circular shape. Furthermore, it can be provided that the circularly ring shaped supporting web is arranged coaxially to the clamping plate and/or receiving plate, which is preferably circular cylindrical. With the fastening area it is possible to fix the supporting web, which is in particular integrally formed on the receiving plate, on the upper surface of the clamping plate. For this purpose, the fastening area preferably extends radially outwards from a circular cylindrical outer surface of the support web. Preferably, it is intended that the fastening area designed as a ring collar is interspersed with recesses which can be used to receive screws with which the fastening area on the upper surface of the clamping plate can be fixed.

It is expedient if a support ring is arranged in the connecting gap coaxially to the support web, which is connected to the upper surface of the clamping plate and to the lower surface of the receiving plate, in particular in a sealing manner. The support ring has a smaller diameter than the circularly shaped support web and is arranged coaxially to the support web. Preferably, an inner surface of the support web and an outer surface of the support ring together with the upper surface of the clamping plate and the lower surface of the receiving plate limit the connecting gap, which in this case is of annular design. For example, the support ring can be used to accommodate a connector designed for electrical coupling of the workpiece pallet with a suitably equipped machining table of a processing machine, for example to provide electrical power to the workpiece pallet and/or to transmit electrical sensor signals from the workpiece pallet to the processing machine. Here, the support ring can be used as a support for the connector on the one hand and as a protective feed-through for electrical supply cables and/or sensor cables on the other hand. Since the support ring has a smaller diameter than the circularly shaped support web and a material thickness of the support web is at best equal to, preferably smaller than, a material thickness of the support ring, the support ring has a similar mechanical rigidity as the support web, which means that inhomogeneous deformation within the workpiece pallet can be at least largely avoided. Preferably, it is intended that a cross-sectional area of the support ring in the cross-sectional plane oriented transversely to the distance between the receiving plate and the clamping plate is less than 30 percent, preferably less than 10 percent, particularly preferably less than 5 percent, of the cross-sectional area of the support web.

According to a further embodiment of the invention, it is provided that at least one heater is associated with the receiving plate, which heater is designed for heating the receiving plate. With the heater, which may in particular be an arrangement of several electrical resistance heaters arranged in suitable recesses in the receiving plate, a specific temperature control of the receiving plate can be carried out. It is preferably provided that the receiving plate is assigned at least one sensor, in particular a temperature sensor, in addition to the at least one heater, with the aid of which a temperature of the receiving plate can be determined and converted into an electrical sensor signal. It is particularly preferred that the workpiece pallet with the heater arranged thereon and the optionally provided sensor is electrically connected to a control device. The control device can, for example, be assigned to the processing machine and enables electrical power to be supplied to the heater. As an example it is provided that the control device realizes a regulation of the temperature of the receiving plate via a temperature-dependent current supply on the basis of the sensor signal of the sensor.

In further embodiment of the invention it is provided that the first interface comprises at least two locking pins which project from an lower surface of the clamping plate remote from the receiving plate and forming a reference plane and whose longitudinal axes aligned parallel to one another and transversely to the reference plane determine a mounting direction for the receiving plate, the at least two locking pins each having at least one undercut with respect to the longitudinal axes. With the locking pins, which are designed to be accommodated in suitable interlocks in the machining table of the processing machine, a rapid and precisely reproducible fixing of the workpiece pallet on the machining table can be realised. The respective undercut is used for positive locking of the locking pins on the machining table, which can be equipped with locking means of variable position for this purpose.

According to a further embodiment of the invention it is provided that an electromechanical plug connector is arranged on the lower surface of the clamping plate, which is designed for a plug connection with a plug-in movement oriented parallel to the direction of assembly and which is designed for an electrical coupling between a plug receptacle arranged on a machining table of a processing machine and at least one electrical consumer assigned to the workpiece pallet and/or at least one sensor assigned to the workpiece pallet.

It is advantageous if the plug connector is accommodated at least in regions in a recess of the clamping plate, the recess being bordered by the supporting web.

It is preferably provided that a first material thickness of the clamping plate deviates from a second material thickness of the receiving plate by an amount of less than 30 percent, preferably less than 20 percent, in particular less than 10 percent. In combination with the different coefficients of thermal expansion of the clamping plate and the receiving plate, this allows the lowest possible level of internal mechanical stress in the workpiece pallet to be achieved.

According to a second aspect of the invention, the task of the invention is solved with a processing system for workpiece processing, which comprises a processing machine with a machine bed, a machining table attached to the machine bed and an application head arranged on the machine bed, wherein an adjusting system for a relative movement between the machining table and the application head is assigned to the machine bed, wherein the application head is designed to deliver a particle stream of metallic particles in the direction of the machining table, wherein the machining table has an interface receptacle for receiving and fixing locking pins and a plug-in receptacle for receiving a workpiece pallet which can be fixed to the machining table, and with a workpiece pallet according to the invention.

Here it is intended that the processing machine is designed for additive workpiece processing, for example with the MPA process (metal powder application process) developed by Hermle Maschinenbau GmbH or a laser-supported application process such as laser sintering.

For this purpose, the processing machine comprises a machine bed, also known as a machine frame, and a machining table attached to the machine bed, in particular with adjustable bearings. Furthermore, the machine bed is assigned an application head which is designed to apply the material onto a workpiece. Furthermore, an adjusting system is provided for a relative movement between the machining table and the application head, which may, for example, comprise one or more electromechanical or hydraulic linear actuators.

The machining table includes an interface fixture for holding and fixing bolt pins of a workpiece pallet. Furthermore, it may be provided that the machining table comprises a plug-in receptacle for receiving a connector associated with the workpiece pallet for an electrical coupling between the processing machine and the workpiece pallet.

It is advantageous if the machine bed is assigned a removal head for machining a workpiece which can be fixed on the workpiece pallet, in particular a milling head or a milling-turning head, and that the adjusting system is designed for a relative movement between the machining table and the removal head and/or that in addition to the processing machine a heat chamber is provided which is designed for temporarily accommodating the workpiece pallet during a heating process.

It is preferably provided that, in addition to the processing machine, a machining centre is provided which comprises at least one removal head for machining a workpiece which can be fixed on the workpiece pallet, in particular a milling head, and that a machining table of the machining centre comprises an interface receptacle for receiving and fixing bolt pins and a plug-in receptacle for receiving a workpiece pallet in accordance with the invention. As an example, it can be provided that a workpiece pallet or several workpiece pallets are changed between the processing machine and the machining centre with the aid of an automated handling device (workpiece changer), in particular an industrial robot, for an alternating sequence of material addition processing steps and material removal processing steps. Here it is advantageous that both the machining table of the processing machine and the machining table of the processing centre, which may be a milling-turning centre in particular, have the same interface receptacles, with which a fast fixing or release of the respective workpiece pallet on the respective machining table can be achieved with a high repeat accuracy.

BRIEF DESCRIPTION OF THE DRAWINGS

An advantageous embodiment of the invention is shown in the drawing. Here shows.

DETAILED DESCRIPTION

Figure 1:
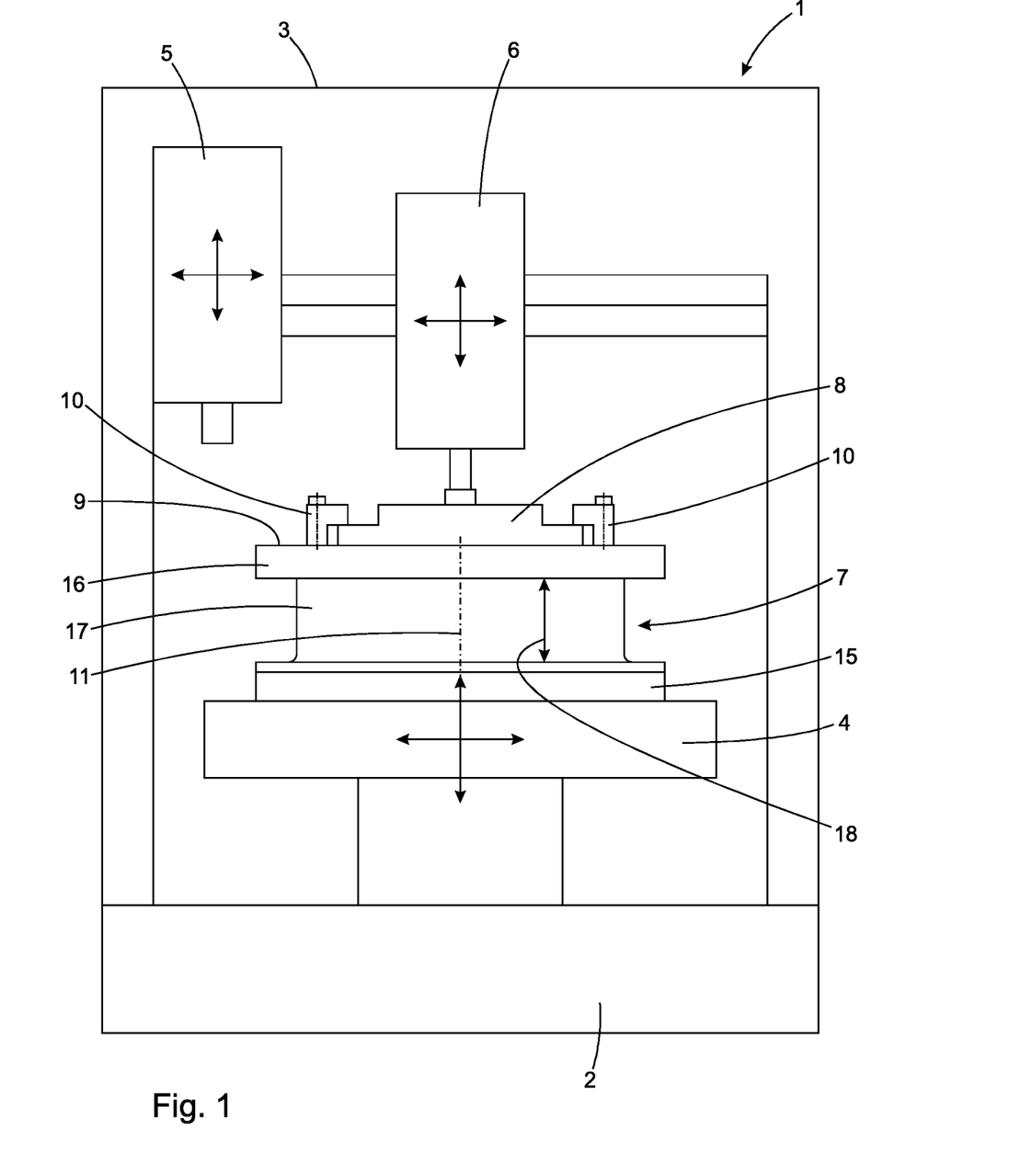
FIG. 1 shows a purely schematic representation of a machining system for additive and subtractive workpiece machining with a machine bed, a machining table, an application head, a removal head as well as a workpiece pallet and a workpiece, FIG. 2 a sectional view of the workpiece pallet as shown in FIG. 1, and FIG. 3 a sectional view of the machining table as shown in FIG. 1.

A machining system 1 shown in FIG. 1 purely schematically is designed to perform additive workpiece machining and subtractive workpiece machining. As an example, the machining system is a machining center that is designed to perform milling operations (subtractive workpiece machining), to perform turning operations (subtractive workpiece machining) and to perform the MPA process (additive workpiece machining) developed by Hermle Maschinenbau GmbH, wherein the present invention can also be used for other machining processes, in particular other additive manufacturing processes.

Purely as an example, it is intended that the machining system 1 comprises a machine bed 2, on which a machine housing 3 is placed. The machine housing 3 limits a spatial volume, which is only indicated schematically, within which the machining processes are carried out, which can be carried out with the aid of machining system 1. As an example, a machining table 4, an application head 5 and a removal head 6 are arranged on the machine bed 2. In the case of a variant of the machining system not shown in more detail, it is intended that the application head is combined with the removal head or that the application head and the removal head are arranged in different processing machines.

Furthermore the machining table 4, the application head 5 and the removal head 6 are each assigned unspecified (not shown) actuating devices, in particular electromechanical actuators, respectively. Thus the application head 5 and the removal head 6 can each be moved relative to the machine bed 2 in at least two spatial directions perpendicular to each other. Furthermore, it may be provided, for example, that the application head 5 and the removal head 6 can additionally be moved normally to the plane shown in FIG. 1 in a manner not shown in detail. The machining table 4 can be rotated in two spatial directions relative to the machine bed 2. In particular, the machining table 4 can be rotated about the center axis 11 of the workpiece pallet 7 to enable turning machining.

Figure 2:
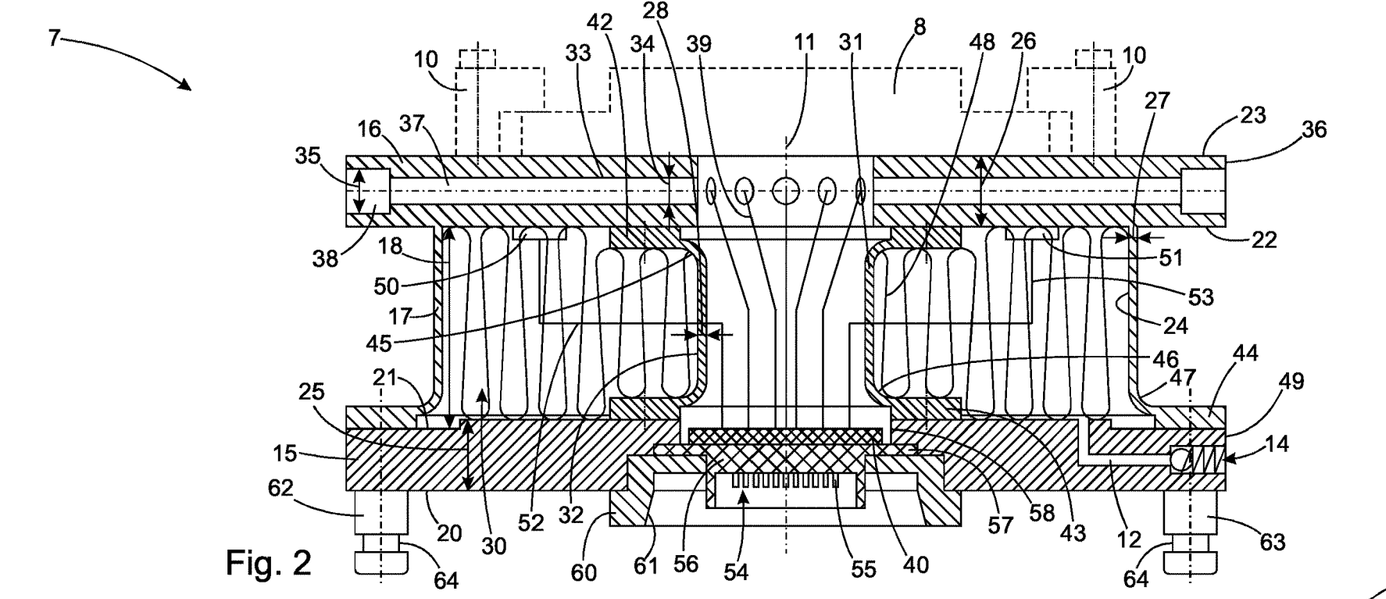
Figure 3:
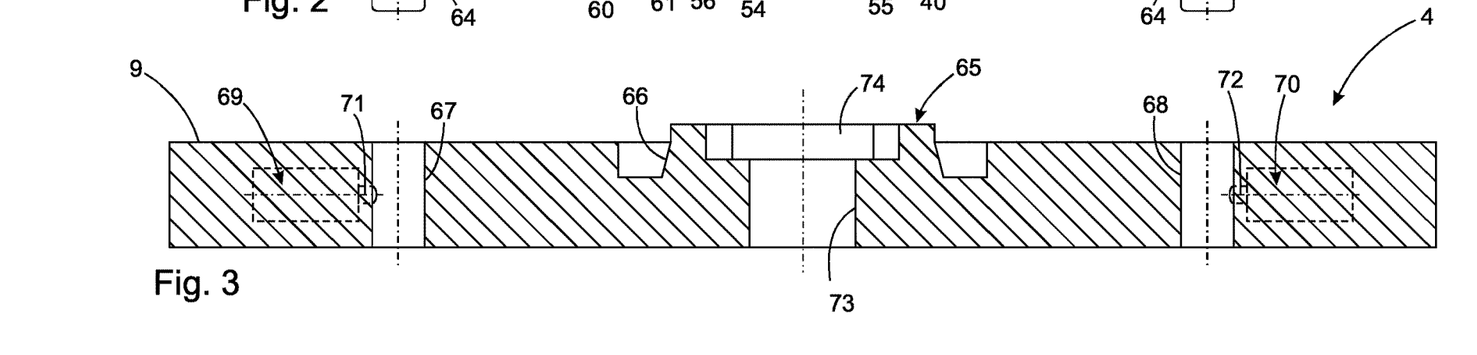

A workpiece pallet 7 is arranged on the machining table 4, which is purely exemplary in the form of a plate, which is fixed to the machining table 4 with fasteners (locking pins 62, 63; locking elements 71, 72) shown in more detail in FIGS. 2 and 3, and which in turn carries a workpiece 8 which is to be machined with the aid of the application head 5 and the removal head 6.

Machining of workpiece 8 with the removal head 6, which may be a milling head for carrying out milling operations on workpiece 8, is possible, for example, at a workpiece temperature of 20 degrees Celsius, but can also be carried out at other, particularly higher, workpiece temperatures.

By contrast, additive workpiece machining requires a significantly higher workpiece temperature. This is due to the fact that, for example, the MPA process requires the workpiece 8 to be heated to a temperature that lies within an interval of approximately 350 degrees Celsius to 450 degrees Celsius. In this case, workpiece 8 is heated by means of partial heating of workpiece pallet 7. Due to the heat radiated from the partially heated workpiece pallet 7 as well as from the heated workpiece 8, there is at least some heating of the space enclosed by the machine housing 3.

In order to keep the heating of the other components of machining system 1 as low as possible, measures must be taken, for example, to limit heat transfer from workpiece pallet 7. Workpiece pallet 7 is set up for this purpose in the manner described in more detail below. Furthermore, it may be provided for heat radiated from workpiece pallet 7 and workpiece 8 into the machine frame 3 to be dissipated in a suitable manner from the machine frame 3, for example by air circulation with intermediate cooling.

As can already be seen from the purely schematic representation in FIG. 1, the workpiece pallet 7 comprises a clamping plate 15 made of a first metal material, in particular a first steel alloy, a receiving plate 16 made of a second metal material, in particular a second steel alloy, arranged at a distance from the clamping plate 15, and a supporting web 17 which extends between the clamping plate 15 and the receiving plate 16.

As an example, it is intended that the clamping plate 15 rests on the substantially flat surface 9 of the machining table 4 with an lower surface 20 shown in more detail in FIG. 2. The essentially flat lower surface 20 forms a first interface of the workpiece pallet 7.

It may also be provided that the support web 17 extends between a top side 21 of the clamping plate 15 and a bottom side 22 of the receiving plate 16. In addition, it is also possible that the workpiece 8 is fixed on a purely exemplary flat upper surface 23 of the receiving plate 16, which serves as a second interface of the workpiece pallet 7, for example with clamping claws 10.

As can be seen from the purely schematic and non-scaled illustration in FIG. 2, the supporting web 17 is formed in one piece with the receiving plate 16 and extends from the lower surface 22 of the receiving plate 16 along a central axis 11 of the workpiece pallet 7 towards the upper surface 21 of the clamping plate 15. The supporting web 17 is made purely exemplarily from the same metal material as the receiving plate 16. Furthermore, it is provided as a purely exemplary feature that the clamping plate 15 and the receiving plate 16 are each formed as circular cylindrical plane-parallel plates, which are each arranged coaxially to the center axis 11.

Furthermore, it is provided that a first material thickness 25 of the clamping plate and a second material thickness 26 of the receiving plate are essentially identical. In contrast, a third material thickness 27 of the supporting plate 17 is considerably smaller than the first and second material thicknesses 25, 26. As an example, the first material thickness 25 and the second material thickness 26 are each approx. 30 mm, while the third material thickness is approx. 1 mm.

The lower surface 22 of the receiving plate 16, the upper surface 21 of the clamping plate 15 and an inner surface 24 of the supporting web 17 define a cavity 30. Purely as an example, the cavity 30 is additionally defined by an outer surface 32 of a supporting ring 31, which is arranged coaxially to the central axis 11. Both the support ring 31 and the support web 17 are designed as circular cylindrical sleeves with an extension along the central axis 11 and are arranged coaxially to each other. Furthermore, it is provided that a fourth material thickness 28 of the supporting ring 31 is purely exemplary 0.5 mm, the relevant representation of FIG. 2 is not to scale.

By selecting the third material thickness 27 and the fourth material thickness 28, which are considerably thinner than the first material thickness 25 and the second material thickness 26, a high heat transfer resistance can be achieved between the support plate 16 and the clamping plate 15, thus limiting heat transfer between the support plate 16 and the clamping plate 15.

FIGS. 1 and 2 show that a gap width of a connecting gap 18 extending between the lower surface 20 of the clamping plate 15 and the upper surface 23 of the receiving plate 16 is larger than the first material thickness 25 and the second material thickness 26, for example 1.6 times the first material thickness 25.

As an example, it is provided that the support ring 31, which extends as a circular cylindrical sleeve along the central axis 11, has a ring collar 42, 43 at each end serving as a fastening area. As an example, it is provided that the ring collar 42 rests with an axially aligned end face against the lower surface 22 of the receiving plate 16 and is sealingly connected to the receiving plate 16 by fasteners not shown in more detail, for example screws. In the same way, the annular collar 43 bears with an axially aligned end face against the upper surface 21 of the clamping plate 15 and is sealingly fixed there by fasteners, in particular screws, which are likewise not shown in more detail.

The support web 17, which is integrally formed in one piece on the receiving plate 16, is provided with a ring collar 44 at an end area facing away from the receiving plate 16. This annular collar 44 rests with an axially aligned end face against the upper surface 21 of the clamping plate 15 and is sealingly fixed to the clamping plate 15 with fasteners, in particular screws, which are not shown in detail.

As a purely exemplary design, a transition between the respective ring collar 42, 43, 44 and the support ring 31 or the support web 17 is designed with a curvature 45, 46, 47 in each case. The curvatures 45, 46, 47 are dimensioned, taking into account the respective material thickness 27, 28 as well as the properties of the metal material from which the support ring 31 or the support web 17 are made, in such a way that these areas of the support ring 31 or the support web 17 can be elastically deformed within certain limits serving as solid body joints. This enables a relative movement between the clamping plate 15 and the support plate 16, as may occur in the event of heat-induced expansion of the workpiece pallet 7.

As an example, it is provided that in the receiving plate 16, which is designed as a circular cylindrical plane-parallel plate, several axial bores are made, each of which extends radially outwards from the centre axis 11, and which are arranged in the same angular division relative to the centre axis 11 in a cross-sectional plane which is not shown and which is aligned transversely to the centre axis 11. The axial bores 33 are each circular cylindrical in shape with a first diameter 34 and each have a step in diameter at the end to a second diameter 35 and terminate at an annular outer surface 36 of the receiving plate 16. In the axial bores 33, circular cylindrical shaped heating cartridges 37, which are not shown in detail, are accommodated, each of which is fixed in the respective axial bore 33 by a plug 38 screwed into the axial bore 33 in a manner not shown in detail. Each of the heating cartridges 37 is connected via an electrical supply line 39 to a printed circuit 40 associated with a connector 54 located in the clamping plate 15.

Two temperature sensors 50, 51 are arranged on the lower surface 22 of the receiving plate 16, which temperature sensors 50, 51 are electrically connected to the printed circuit board 40 via sensor lines 52, 53. The printed circuit board 40 is connected to contact pins 55 of an electromechanical plug connector 54 assigned to the clamping plate 15. The plug connector 54 has, as an example, a connector housing 56 which is rotationally symmetrical to the central axis 11 and is accommodated with a radially projecting ring collar 57 in a recess 58 in the clamping plate 15, which is designed as a stepped bore. In order to ensure that the plug connector 54 is fixed to the clamping plate 15, a centering bushing 60 is accommodated in the recess 58, which positively secures the ring collar 57 of the plug connector to the clamping plate 15. An inner surface 61 of the centering bushing 60 has a conical sectional shape in some areas and thus serves to center the workpiece pallet 7 relative to the machining table 4.

As shown in FIG. 3, the machining table 4 is provided with a centrally arranged centering pin 65, the outer surface 66 of which, at least in areas, is shaped like a section of a cone and is adapted to the inner surface 61 of the centering bushing 60 in order to ensure positive centering between the workpiece pallet 7 and the machining table 4.

For locking the workpiece pallet 7 on the machining table 4, the machining table 4 comprises, purely as an example, at least two through holes 67, 68, each of circular cylindrical design, which are aligned perpendicular to the flat surface 9 of the machining table 4. An actuator 69, 70 is assigned to each of the through-bores 67, 68, which can be designed as a hydraulic cylinder, for example, and which is provided for the linear movement of a respectively assigned locking element 71, 72. The locking element 71, 72 can be used to provide a form-fit fixing of a locking pin 62, 63 to be accommodated in the respective through-bore 67, 68 and arranged on the lower surface 20 of the clamping plate 15. For this purpose, each of the locking pins 62, 63 is provided with a recess 64 in the form of an annular groove which forms an undercut in the axial direction along the central axis 11 and prevents the workpiece pallet 7 from being removed from the machining table 4 if the locking elements 71, 72 of the actuators 69, 70 engage in the respective recess 64.

In a central recess 73 of the centering pin 65 there is arranged a socket 74 which is provided for electro-mechanical coupling with the plug connector 54 and which comprises unspecified sockets adapted to the contact pins 55, which in turn are connected in unspecified manner to an electrical line arrangement which passes through the recess 73 and which can be connected in likewise unspecified manner to a machine control of the machining system 1.

As can also be seen in FIG. 2, cavity 30 contains an insulating material 48 formed purely from glass fibre mats, which at least largely prevents heat transfer between the receiving plate 16 and the clamping plate 15 by radiant heat. Thus, heat transfer between the receiving plate 16 and the clamping plate 15 is largely limited to the thermal coupling of these two components by means of the support web 17 and the support ring 31.

According to the above description, both the support ring 31 and the support web 17 are sealingly connected to both the clamping plate 15 and the receiving plate 16, therefore the cavity 30 is sealed, in particular gas-tight. In order to limit an expansion of gas in cavity 30 during the heating of the receiving plate 16 as well as an associated pressure increase in cavity 30 to a level at which damage to the workpiece pallet 7 cannot occur, a fluid channel 12 is formed in the clamping plate 15. The fluid channel 12 extends between the cavity 30 and a surrounding area of the workpiece pallet 7 and opens out purely exemplarily at an outer circumferential surface 49 of the clamping plate 15. In the fluid channel 12, a spring-preloaded check valve 14 is arranged. This valve is configured in such a way that it opens when a pre-settable pressure difference between a pressure in the cavity 30 and an ambient pressure exists, thus allowing gas to escape from the cavity 30.

A mode of operation of machining system 1 can be described as follows:

First of all, the workpiece pallet 7 is provided with a workpiece 8 at a suitable workstation away from machining system 1, which is precisely aligned with the centering bushing 60 serving as centering means and is fixed in this position on the upper surface 23 of the receiving plate 16 with the aid of clamping claws 10.

The workpiece pallet 7 provided with workpiece 8 is then placed in a heating cabinet, which is also not shown, in which a temperature prevails, for example, such as that which already exists for the clamping plate 15 during the subsequent machining in machining system 1 due to the heating of the receiving plate 16 and the workpiece 8 attached to it. In this heating cabinet, electrical contact is made with connector 54, so that the heating cartridges 37 in the receiving plate 16 can be supplied with electrical energy and the receiving plate 16 and the workpiece 8 attached to it can be heated up to a specified target temperature, especially to 400 degrees Celsius.

Once the target temperature for workpiece 8 has been reached, workpiece pallet 7 can be transferred to machining system 1 and can be placed on the machining table 4. This placing process is carried out in the course of a downward lowering movement for workpiece pallet 7 along the central axis 11, whereby the locking pins 62, 63 engage in the through holes 67, 68. Furthermore, the mechanical interaction between the centering bushing 60 and the centering pin 65 ensures precise mechanical alignment of the workpiece pallet 7 with respect to the machining table 4. The actuators 69, 70 are then actuated so that the locking elements 71, 72 move into the recesses 64 of the locking pins 62, 63, thus ensuring positive locking of the workpiece pallet 7 on the machining table 4 in all spatial directions.

The geometrical centre point of the workpiece pallet 7 is fixed backlash-free in relation to the machining table 4 via the centring effect between the centring bush 60 and the outer surface 66 of the centring pin 65. Preferably, only these two components are responsible for centering workpiece pallet 7 relative to machining table 4, while all other components, such as the locking pins 62, 63, are only used to fix workpiece pallet 7 on machining table 4, but not for centering with respect to the center axis 11.

Since the electrical connection between the plug connector 54 and the socket 74 is also established when workpiece pallet 7 is attached to the machining table 4, from this point on a further supply of electrical energy to the heating cartridges 37 in the receiving plate 16 can also take place, so that the temperature of the receiving plate 16 and the workpiece 8 attached to it may be maintained. The temperature of the receiving plate 16 can be monitored by a machine control (not shown) with the aid of the temperature sensors 50, 51 and the energy supply to the cartridge heaters 37 required for the target temperature for workpiece 8 can be provided.

Subsequently, a relative movement of the machining table 4 as well as suitable relative movements of the application head 5 or the removal head 6 can be carried out in order to perform additive or subtractive machining of the workpiece 8. After completion of the machining steps on workpiece 8, workpiece pallet 7 is unlocked by suitable control of the actuators 69, 70 so that workpiece pallet 7 with the workpieces 8 picked up on it can be removed from the machining system.

What is claimed is:

1. A workpiece pallet comprising a clamping plate which comprises a first interface for a form-fitting fixation to a machining table of a processing machine, the workpiece pallet further comprising a receiving plate, which comprises a second interface for fixing a workpiece, wherein the clamping plate and the receiving plate are arranged spaced apart from one another and wherein a supporting web is arranged in a connecting gap between an upper surface of the clamping plate and a lower surface of the receiving plate, which supporting web is connected to the upper surface of the clamping plate and to the lower surface of the receiving plate, the supporting web having in a cross-sectional plane aligned parallel to the lower surface of the receiving plate a cross-sectional area which is less than 15 percent of an area of the lower surface of the receiving plate.

2. The workpiece pallet according to claim 1, wherein the clamping plate is made of a first metal material with a first coefficient of thermal expansion, and wherein the receiving plate is made of a second metal material with a second coefficient of thermal expansion, wherein the first coefficient of thermal expansion is greater than the second coefficient of thermal expansion and wherein the second coefficient of thermal expansion is less than $16/1000000$ [1/K].

3. The workpiece pallet according to claim 1, wherein at least one cavity is delimited by the supporting web, the clamping plate and the receiving plate.

4. The workpiece pallet according to claim 3, wherein at least one insulating material from the group: gas, liquid, solid, is accommodated in the cavity and/or wherein the cavity is evacuated.

5. The workpiece pallet according to claim 3, wherein a compensating valve is attached to the clamping plate or to the receiving plate or to the supporting web, which compensating valve is designed for a predeterminable, fluidically communicating connection between the cavity and an environment of the workpiece pallet for limiting a differential pressure between the cavity and the environment.

6. The workpiece pallet according to claim 1, wherein the supporting web is formed in one piece with the receiving plate and projects from a lower surface of the receiving plate facing the clamping plate in the direction of the clamping plate and is fixed with fasteners to an upper surface of the clamping plate facing the receiving plate.

7. The workpiece pallet according to claim 6, wherein the supporting web is designed as a circular ring which extends along a spacing axis between the clamping plate and the receiving plate and which has a fastening region which is designed as an annular collar extending in the radial direction and which is penetrated by the fasteners which are arranged on the upper surface of the clamping plate.

8. The workpiece pallet according to claim 6, wherein a support ring is arranged in the connecting gap coaxially to the support web, which support ring is connected to the upper surface of the clamping plate and to the lower surface of the receiving plate.

9. The workpiece pallet according to claim 1, wherein at least one heater is associated with the receiving plate and is designed for heating the receiving plate.

10. The workpiece pallet according to claim 1, wherein the first interface comprises at least two locking pins which project from a lower surface of the clamping plate facing away from the receiving plate and forming a reference plane and whose longitudinal axes aligned parallel to one another and transversely to the reference plane determine a mounting direction for the receiving plate, the at least two locking pins each having at least one undercut relative to the longitudinal axes.

11. The workpiece pallet according to claim 10, wherein an electromechanical plug connector is arranged on the lower surface of the clamping plate, which is designed for a plug connection with a plug-in movement aligned parallel to the assembly direction and for an electrical coupling between a plug-in receptacle arranged on a machining table of a processing machine and at least one electrical consumer associated with the workpiece pallet and/or at least one sensor associated with the workpiece pallet.

12. The workpiece pallet according to claim 11, wherein the plug connector is received at least partially in a recess of the clamping plate, the recess being bordered at least partially by the supporting web.

13. The workpiece pallet according to claim 1, wherein a first material thickness of the clamping plate differs from a second material thickness of the receiving plate by an amount of less than 30 percent.

14. The workpiece pallet according to claim 1, wherein the supporting web is made of a metal material, which has a specific thermal conductivity of less than 30 W/mK.

15. The workpiece pallet according claim 1, wherein the supporting web is made of a metal material, which has a coefficient of thermal expansion of less than $16/1000000$ [1/K].

* * * * *